United States Patent
Sugimoto et al.

(10) Patent No.: US 10,608,261 B2
(45) Date of Patent: Mar. 31, 2020

(54) FUEL CELL

(71) Applicant: NISSAN MOTOR CO., LTD., Yokohama-shi, Kanagawa (JP)

(72) Inventors: Hiromi Sugimoto, Kanagawa (JP); Shinji Miyagawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/320,013

(22) PCT Filed: Jul. 29, 2016

(86) PCT No.: PCT/JP2016/072440
§ 371 (c)(1),
(2) Date: Jan. 23, 2019

(87) PCT Pub. No.: WO2018/020684
PCT Pub. Date: Feb. 1, 2018

(65) Prior Publication Data
US 2019/0252691 A1    Aug. 15, 2019

(51) Int. Cl.
| H01M 8/0273 | (2016.01) |
| H01M 8/0206 | (2016.01) |
| H01M 8/2425 | (2016.01) |
| H01M 8/0282 | (2016.01) |
| H01M 8/1213 | (2016.01) |
| H01M 8/124  | (2016.01) |

(52) U.S. Cl.
CPC ....... *H01M 8/0273* (2013.01); *H01M 8/0206* (2013.01); *H01M 8/0282* (2013.01); *H01M 8/1213* (2013.01); H01M 8/2425 (2013.01); H01M 2008/1293 (2013.01)

(58) Field of Classification Search
CPC ............ H01M 8/0273; H01M 8/0276; H01M 8/0278; H01M 8/028; H01M 8/0282; H01M 8/1213; H01M 2008/1293; H01M 8/0206; H01M 8/2425
USPC ....................................................... 429/460
See application file for complete search history.

(56) References Cited

U.S. PATENT DOCUMENTS

| 5,942,348 A | 8/1999 | Jansing et al. |
| 6,656,625 B1 * | 12/2003 | Thompson ............. B32B 18/00 429/465 |
| 2004/0209147 A1 * | 10/2004 | Finkenwirth ............ C25B 9/18 429/442 |
| 2005/0186463 A1 | 8/2005 | Finkenwirth et al. |
| 2013/0280634 A1 | 10/2013 | Park et al. |

FOREIGN PATENT DOCUMENTS

| JP | 2004-227848 | * | 8/2004 |
| JP | 2004-319286 A | | 11/2004 |
| JP | 2006-236989 A | | 9/2006 |
| JP | 2006-244913 | * | 9/2006 |
| JP | 2007-323957 A | | 12/2007 |
| JP | 2011-222161 A | | 11/2011 |
| JP | 2013-257989 A | | 12/2013 |
| JP | 2014-504778 A | | 2/2014 |

OTHER PUBLICATIONS

Machine translation of JP 2004-227848, published on Aug. 12, 2004 (Year: 2004).*
Machine translation of JP 2006-244913, published on Sep. 14, 2006 (Year: 2006).*

* cited by examiner

*Primary Examiner* — Anca Eoff
(74) *Attorney, Agent, or Firm* — Foley & Lardner LLP

(57) ABSTRACT

A fuel cell includes a metal supporting plate, a cell structure, a separator, a glass sealing member and a coating layer. The cell structure includes an electrolyte layer disposed on the metal supporting plate. The separator is disposed on the cell structure. The glass sealing member is disposed between the metal supporting plate and the separator at an outer side of the cell structure. The coating layer is disposed between the metal supporting plate and the glass sealing member and is contact with the metal supporting plate and the glass sealing member. The cell structure and the coating layer are provided with a gap predetermined between the cell structure and the coating layer.

10 Claims, 6 Drawing Sheets

FUEL CELL

TECHNICAL FIELD

The present invention relates to a fuel cell.

BACKGROUND ART

A metal-supported solid oxide fuel cell stacks that have been proposed is advantageous in cost and can be formed through simple production steps since no cell frame is formed. Such a fuel cell stack includes unit cells, at least one separator plate that is disposed between two or more unit cells to connect them in series, and at least one sealer that is formed between a unit cell and the separator plate. The unit cell includes a metal support, a first electrode formed on one side of the metal support, an electrolyte formed on one side of the first electrode, and a second electrode with a different polarity from the first electrode, the second electrode being formed on one side of the electrolyte. Further, manifolds that serve as fluid channels are formed in the metal support, the first electrode, the electrolyte and the second electrode (see Patent Document 1).

CITATION LIST

Patent Document

Patent Document 1: JP 2014-504778A

SUMMARY OF INVENTION

Technical Problem

In the fuel cell stack in Patent Document 1, the electrolyte extends to the end of the metal support in order to prevent cross leakage. A problem with this fuel cell stack is that cross leakage may occur when a crack is formed in the sealer due to a thermal stress or the like and the crack propagates to the electrolyte or when a crack is formed in the part of the electrolyte in contact with the sealer and the crack propagates in the in-plane direction to the center part of the electrolyte.

The present invention has been made in view of the problem in the prior art. It is an object of the present invention to provide a fuel cell in which the occurrence of cross leakage is prevented more reliably.

Solution to Problem

The present inventors conducted a keen study to achieve the above-described object. As a result, they found that the above-described object is achieved by disposing a predetermined coating layer between a metal supporting plate and a glass sealing member. The present invention has been thus completed.

Advantageous Effects of Invention

With the present invention, it is possible to provide a fuel cell in which a crack is prevented from propagating to reach an electrolyte, and the occurrence of cross leakage can be thus prevented more reliably.

DESCRIPTION OF EMBODIMENTS

Figure 1:
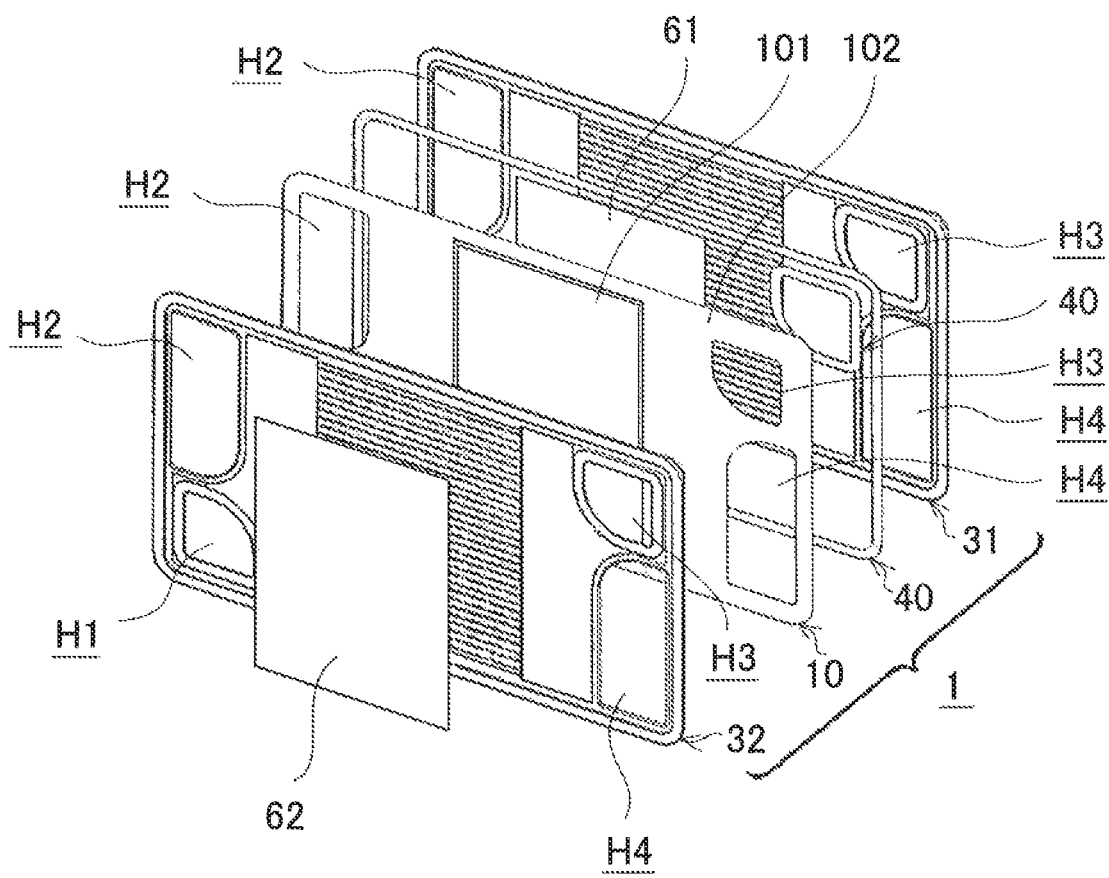
FIG. 1 is a schematic explanatory view of a fuel cell according to a first embodiment of the present invention in a disassembled state.

Hereinafter a fuel cell according to an embodiment of the present invention will be described referring to the drawings. The dimension of the drawings referred to in the following description is exaggerated for descriptive reasons and may be different from the actual dimension.

First Embodiment

Figure 2:
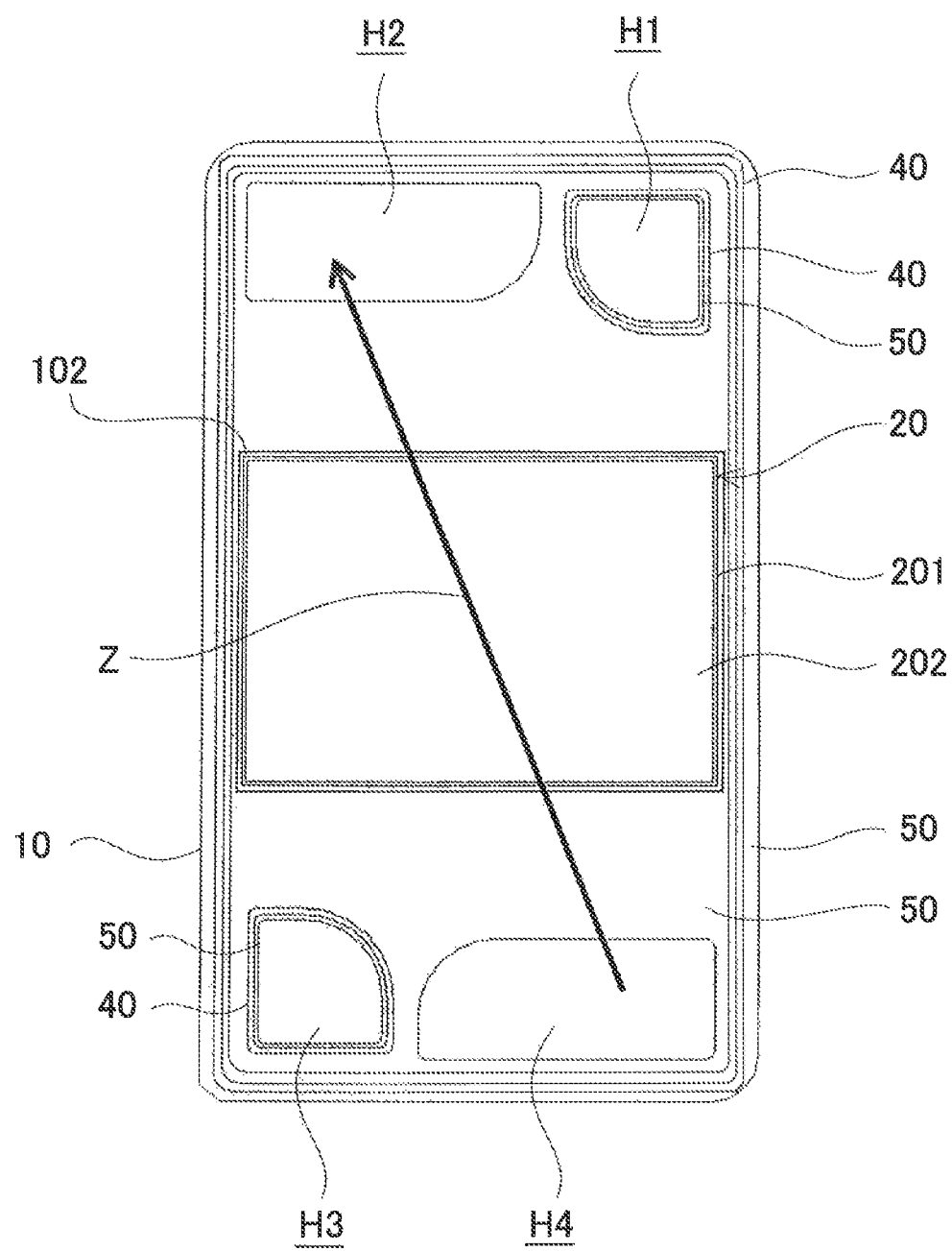
FIG. 2 is an explanatory view of one major side of a metal supporting plate in FIG. 1.
Figure 3:
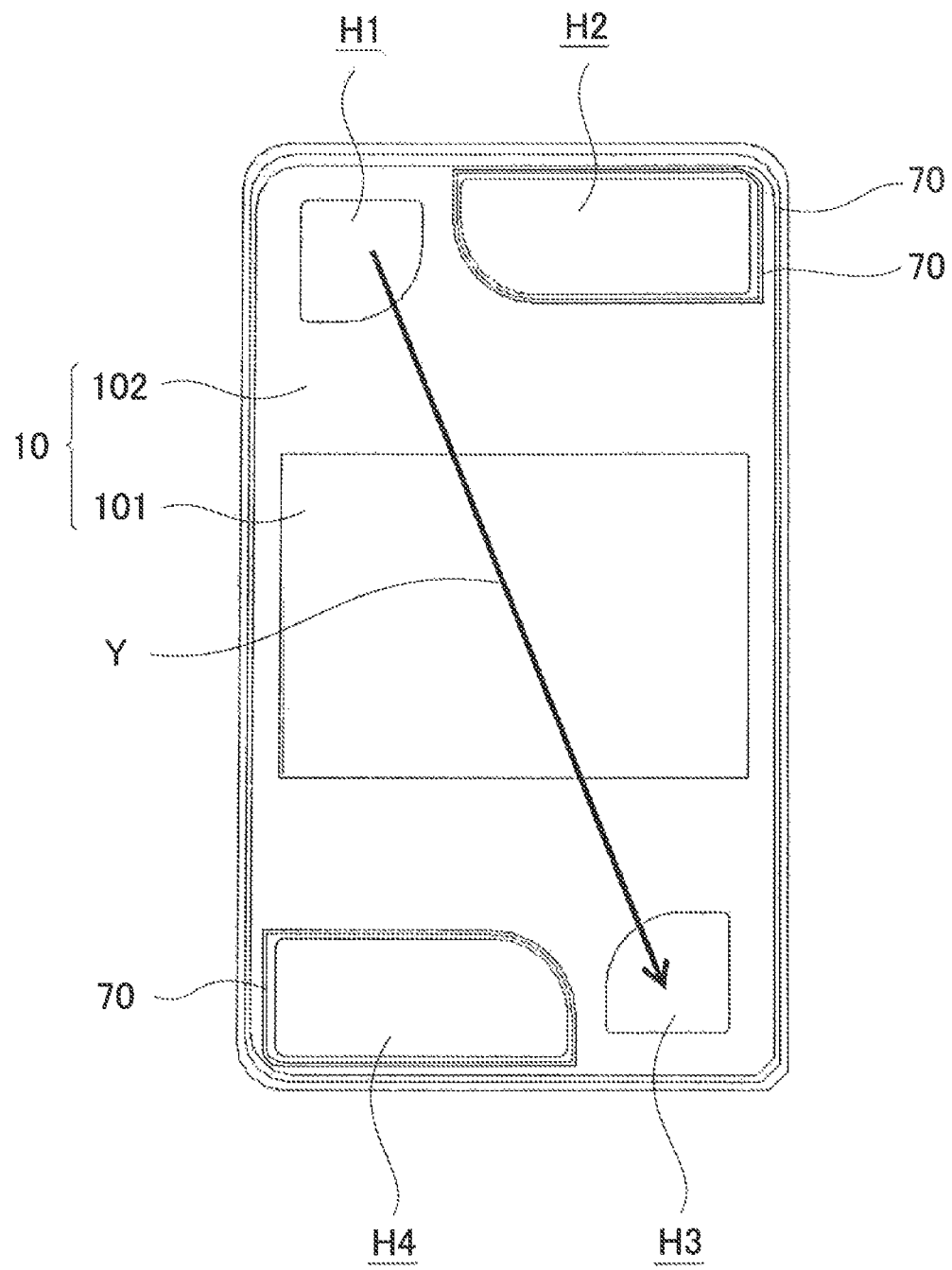
FIG. 3 is an explanatory view of the other major side of the metal supporting plate in FIG. 1.
Figure 4:
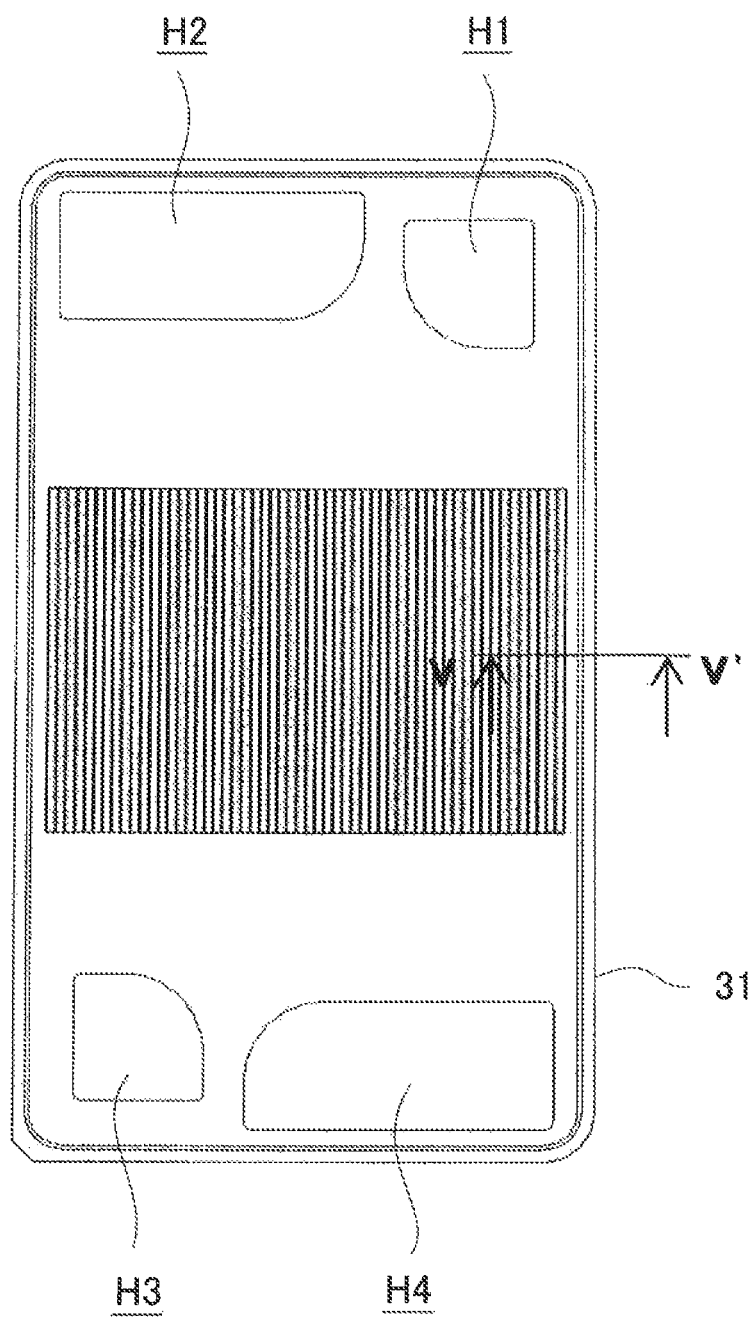
FIG. 4 is a schematic explanatory view of the fuel cell in FIG. 1 in an assembled state.
Figure 5:
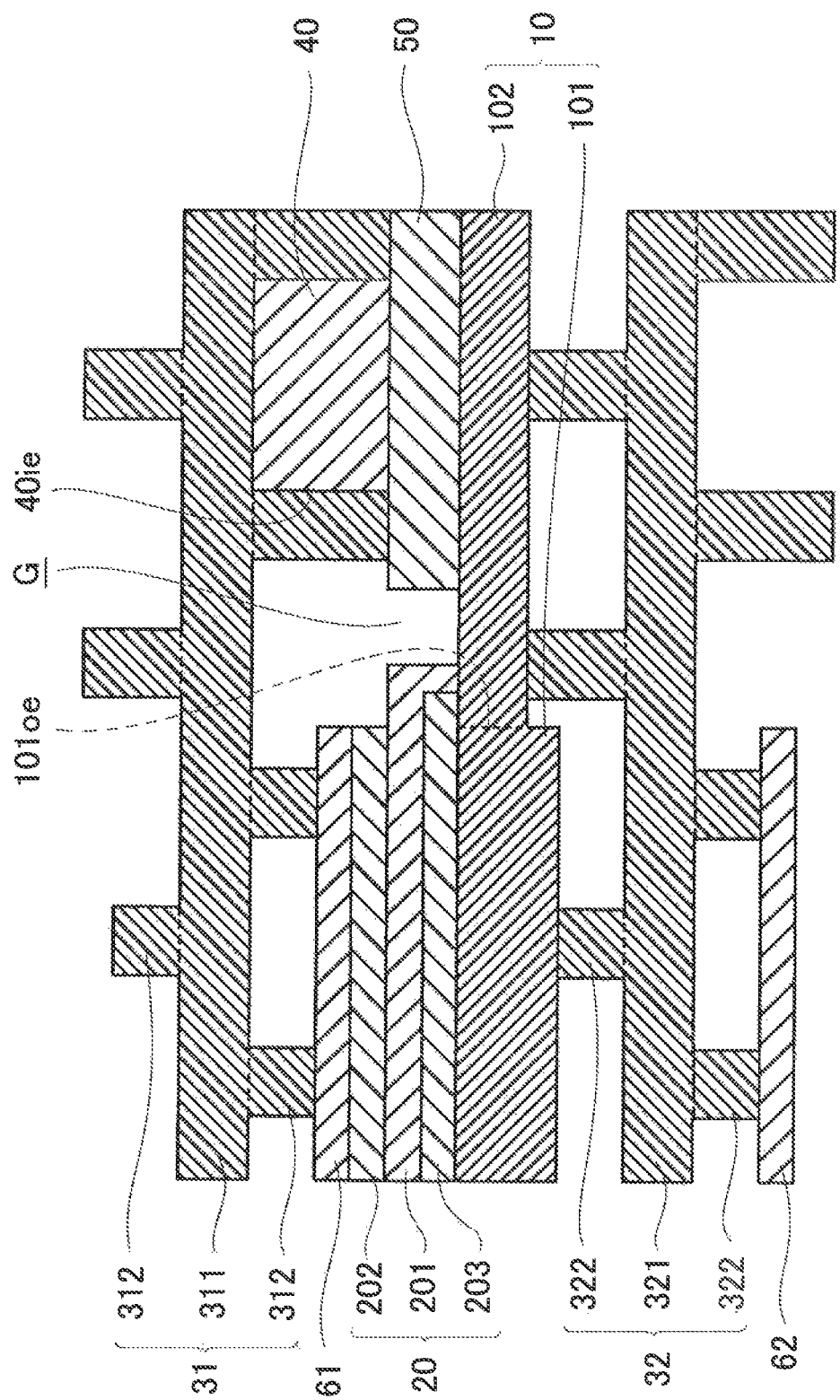
FIG. 5 is a schematic cross-sectional view of the fuel cell in FIG. 4 taken along the line V-V'.

First, a fuel cell according to a first embodiment of the present invention will be described. FIG. 1 is a schematic explanatory view of the fuel cell according to the first embodiment in a disassembled state. FIG. 2 is an explanatory view of one major side of a metal supporting plate in FIG. 1. As used herein, one major side refers to the side on which a separator 21 is disposed in FIG. 1. In FIG. 2, glass sealing members are disposed. FIG. 3 is an explanatory view of the other major side of the metal supporting plate in FIG. 1. As used herein, the other major side refers to the side on which a separator 22 is disposed in FIG. 1. In FIG. 3, sealing portions are formed. FIG. 4 is a schematic explanatory view of the fuel cell in FIG. 1 in an assembled state. FIG. 5 is a schematic cross-sectional view of the fuel cell in FIG. 4 taken along the line V-V'.

As illustrated in FIG. 1 to FIG. 5, the fuel cell 1 according to the embodiment includes the metal supporting plate 10, a cell structure 20, a separator 31, the glass sealing members 40 and a coating layer 50. In the illustrated example, the fuel cell 1 includes a separator 32 that is similar to the separator 31. It is preferred that the separator 31 and the separator 32 are identical to each other in terms of reducing the number of types of parts and ease of stacking fuel cells to form a fuel cell stack. However, they may be different from each other. In the illustrated example, the fuel cell 1 includes a porous current collector 61. It is preferred that the fuel cell 1 includes the porous current collector in terms of improving the current collecting performance at an air electrode layer, which is explained in detail below. However, the porous current collector may not be provided. In the illustrated example, the fuel cell 1 includes another porous current collector 62 at the side facing the separator 32 as with the side facing the separator 31. It is preferred that the porous current collector 61 and the porous current collector 62 are identical to each other in terms of reducing the number of types of parts. However, they may be different from each other. In the illustrated example, sealing portions 70 are formed on the other major side of the metal supporting plate 10.

For example, it is preferred that the metal supporting plate 10 includes a porous portion 101 at the inside and a dense portion 102 at the outside with respect to the in-plane direction perpendicular to the thickness direction. As used herein, the term "porous" means having permeability to gas such as fuel gas and oxidant gas. Further, the term "dense" means having impermeability to gas such as fuel gas and oxidant gas. In the illustrated example, the dense portion 102 of the metal supporting plate 10 forms a frame that blocks gas permeation. The frame composed of the dense portion 102 has through holes H1 to H4 through which fuel gas or oxidant gas flow. In the illustrated example, one major side of the metal supporting plate 10 is a flat surface. It is preferred that one major side is a flat surface in terms of ease of forming an electrolyte layer (explained in detail below) and a coating layer made of a material same as the electrolyte layer by patterning. However, the metal supporting plate 10 is not limited thereto. It is preferred that the metal supporting plate 10 is made of, for example, stainless steel in terms of high heat resistance. However, the material of the metal supporting plate 10 is not particularly limited. The metal supporting plate 10 may be made from a porous plate by compressing a peripheral part thereof to form the predetermined porous portion and the predetermined dense portion. However, the metal supporting plate 10 is not particularly limited. The through holes may be formed by machining after the compression. However, the process is not limited thereto.

The cell structure 20 includes an electrolyte layer 201. The electrolyte layer 201 is disposed on the metal supporting plate 10. In the illustrated example, the size of the electrolyte layer 201 in the in-plane direction is larger than the size in the in-plane direction of the porous portion 101 of the metal supporting plate 10. This is preferred since it is not necessary to provide another member other than the electrolyte layer 201 for gas sealing in order to prevent cross leakage. However, the structure is not limited thereto. In the illustrated example, the cell structure 20 includes an air electrode layer 202 and a fuel electrode layer 203, and the electrolyte layer 201 is intervened between the air electrode layer 202 and the fuel electrode layer 203. Further, in the illustrated example, the cell structure 20 includes the fuel electrode layer 203 that is disposed between the metal supporting plate 10 and the electrolyte layer 201. With this structure, the fuel cell can exhibit high power generation performance. However, the structure is not limited thereto. For example, although not shown in the figures, the material of the porous portion of the metal supporting plate can be selected so that all or a part of the porous portion functions as the fuel electrode layer. In the illustrated example, the size of the electrolyte layer 201 in the in-plane direction is larger than the size of the fuel electrode layer 203 in the in-plane direction. This is preferred since it is not necessary to provide another member other than the electrolyte layer 201 for gas sealing in order to prevent cross leakage. However, the structure is not limited thereto. The electrolyte layer 201 may be made of an electrolyte material known in the art that is used for electrolyte layers of solid oxide fuel cells. Suitable examples of the material of the electrolyte layer 201 include oxide ion conductors such as yttrium-stabilized zirconia. However, electrolyte layer 201 is not particularly limited. The air electrode layer 202 may be made of an air electrode material known in the art that is used for air electrode layers of solid oxide fuel cells. The fuel electrode layer 203 may be made of a fuel electrode material known in the art that is used for fuel electrode layers of solid oxide fuel cells. The cell structure that is formed by layering the fuel electrode layer 203, the electrolyte layer 201 and the air electrode layer 202 on the metal supporting plate 10 in the written order is generally referred to as a metal-supported cell.

The separator 31 is disposed on the cell structure 20. In the illustrated example, the porous current collector 61 is disposed between the cell structure 20 and the separator 31. In the illustrated example, the separator 32 is disposed on the side of the metal supporting plate 10, on which the cell structure 20 is not disposed. In the illustrated example, the separator 31 includes a flat plate portion 311 and continuous protrusions 312. In the illustrated example, the separator 32 also includes a flat portion 321 and continuous protrusions 322. In the illustrated example, the continuous protrusions 312, 322 are formed in the areas opposed to a power generation area where the cell structure 20 is disposed. The continuous protrusions 312, 322 form channels for fuel gas or oxidant gas. In the illustrated example, each of the separators 31, 32 includes through holes H1 to H4 in the position corresponding to the through holes H1 to H4 of the metal supporting plate 10. Further, it is preferred that the separators 31, 32 are made of, for example, stainless steel in terms of high heat resistance and the like. However, the material is not particularly limited. Although not shown in the figures, the separators 31, 32 include respective continuous uneven portions in the area opposed to the power generation area where the cell structure 20 is disposed, and the continuous uneven portions are formed such that one separator has an inversed shape of the other separator. The uneven portions may form channels for fuel gas or oxidant gas.

The glass sealing members 40 are disposed between the metal supporting plate 10 and the separator 31 at an outer side of the cell structure 20. In the illustrated example, the glass sealing members 40 are disposed along the outer peripheral portion of the metal supporting plate 10 and the separator 31 and around the through holes H1, H3. The glass sealing members 40 may be made of a glass sealing material known in the art that is used for glass sealing members of solid oxide fuel cells.

The coating layer 50 is disposed between the metal supporting plate 10 and the glass sealing member 40. The coating layer 50 is in contact with the metal supporting plate 10 and the glass sealing member 40. In terms of sufficient gas sealing, it is preferred that the coating layer 50 is disposed over the entire projection of the glass sealing member 40 from the separator 31. The cell structure 20 and the coating layer 50 are provided with a gap G predetermined between the cell structure 20 and the coating layer 50. In the illustrated example, the gap G predetermined is on the dense portion 102 of the metal supporting plate 10. It is preferred that the gap C predetermined is on the dense portion 102 of the metal supporting plate 10 since it is not necessary to provide another member for gas sealing in order to prevent cross leakage. In the illustrated example, the width of the gap C predetermined in the in-plane direction is smaller than the distance in the in-plane direction between the outer edge 101oe of the porous portion 101 of the metal supporting plate 10 and the inner edge 40ie of the glass sealing member 40. In this relationship, the coating layer is surely disposed between the glass sealing member and the metal supporting plate. This can not only ensure the prevention of cross leakage but also secure sufficient gas sealing. In the illustrated example, the coating layer 50 is disposed around the through holes H1 and H3 and substantially over the entire surface of the dense portion 102. This is advantageous in maintaining the power generation performance. However, the arrangement is not limited thereto. Although not shown in the figure, the coating layer 50 may be disposed only around the through holes H1, H3 and along the outer periphery of the dense portion 102. It is preferred that the coating layer 50 is made of an insulating material in terms of the flexibility of the structure design. However, the material is not particularly limited. Further, it is preferred that the coating layer 50 contains, for example, the material same as the electrolyte layer. More specifically, it is preferred that the coating layer 50 is made of the material same as the electrolyte layer.

In the illustrated example, the porous current collector 61 is disposed between the separator 31 and the air electrode layer 202. The porous current collector 61 is not particularly limited and may be constituted by any material that can suitably secure the current collectability of the air electrode layer 202 and the gas permeability to oxidant gas on the side of the air electrode layer 202. A suitable example of the porous current collector 61 is that made of an expanded metal. The porous current collector 62 is similar to the porous current collector 61. It is preferred that the porous current collector 61 and the porous current collector 62 are identical in terms of reducing the number of types of parts and ease of stacking the fuel cells to form the fuel cell stack. However, they may be different from each other.

In the illustrated example, the sealing portions 70 are formed along the outer peripheral portion of the metal supporting plate 10 and the separator 32 and around the through holes H2, H4. The sealing portions 70 may be formed by disposing sealing members that are made of a glass sealing material, a wax material or the like. The material same as those described above may be used for the glass sealing material. The wax material may be a wax material known in the art that is used for solid oxide fuel cells. However, the sealing portions 70 are not limited thereto. For example, they may be formed by welding the metal supporting plate 10 with the separator 32. It is preferred that the sealing portions 70 are formed by disposing a wax material or by welding in terms of securing electric conductivity. Further, it is preferred that the sealing portions 70 are formed by welding in terms of reducing the number of parts.

When the fuel cell 1 is in an assembled state, the glass sealing members 40 form the gas sealing between the coating layer 50 of the metal support 10 and the separator 31, and the sealing portions 70 form the gas sealing between the metal support 10 and the separator 32. As illustrated in FIG. 2 and FIG. 3, when the fuel cell generates power, oxidant gas is supplied to the air electrode side through the through hole H4 as illustrated by the arrow Z in the figures, and fuel gas is supplied to the fuel electrode side through the through hole H1 as illustrated by the arrow Y in the figures. Unused oxidant gas is discharged through the through hole H2, and unused fuel gas, reaction product gas, water vapor and the like are discharged through the through hole H3. The oxidant gas may be, for example, oxygen, air or the like. Further, the fuel gas may be, for example, hydrocarbon fuel such as hydrogen or gasoline, hydrocarbon-based fuel such as an alcohol or the like, to which water may be mixed according to need.

To produce the fuel cell stack by stacking fuel cells 1, a cell unit may be used, which is produced by forming the cell structure 20 and the coating layer 50 on the metal supporting plate 10 and joining the separator 32 and the porous current collector 62 onto the side of the metal supporting plate 10, on which the cell structure 20 is not formed. However, the production method is not particularly limited. In terms of securing the conductivity, it is preferred that the joining between the metal supporting plate 10 and the separator 32 and the joining between the separator 32 and the porous current collector 62 are achieved by disposing a wax material or by welding. However, the joining method is not particularly limited. When such cell units are stacked, the separator 31 and the porous current collector 61 of a cell unit also serve as a part of another cell unit. The joining and the gas sealing between the cell units are achieved by the glass sealing members 40. When such cell units are used to assemble the fuel cell stack, it is possible to simplify the production process since it involves only applying the glass sealing material to the cell units and stacking them.

As described above, the fuel cell has the following features (1) to (6). This ensures the prevention of cross leakage.

(1) The fuel cell includes the metal supporting plate, the cell structure, the separator, the glass sealing member and the coating layer.

(2) The cell structure includes the electrolyte layer disposed on the metal supporting plate.

(3) The separator is disposed on the cell structure.

(4) The glass sealing member is disposed between the metal supporting plate and the separator at an outer side of the cell structure.

(5) The coating layer is disposed between the metal supporting plate and the glass sealing member and is in contact with the metal supporting plate and the glass sealing member.

(6) The cell structure and the coating layer are provided with the gap predetermined between the cell structure and the coating layer.

That is, a crack may be formed in the sealing portion that is composed of the glass sealing member and the coating layer due to a thermal stress or the like. However, the gap predetermined between the cell structure and the coating layer can prevent a crack of the glass sealing member or the coating layer from propagating to the cell structure and eventually to the electrolyte layer. This can ensure the prevention of cross leakage.

The coating layer, which is disposed between the metal supporting plate and the glass sealing member, and which is in contact with the metal supporting plate and the glass sealing member, has a secondary advantage of reducing or preventing deterioration of the gas sealing performance between the coating layer and the glass sealing member and the gas sealing performance of the glass sealing material itself. To be more specific, for example, when the coating layer is provided which is made of an oxide as with the electrolyte layer, the coating layer joins to the glass sealing member well since the glass sealing member is also made of an oxide. This can reduce or prevent deterioration of the gas sealing between the coating layer and the glass sealing member. Further, when the coating layer is provided, it can prevent direct contact between the metal supporting plate made of, for example, stainless steel containing chromium and the glass sealing member. This can prevent deterioration of the glass sealing member caused by chromium that is vaporized and diffused at high temperature. As a result, deterioration of the gas sealing performance of the glass sealing member itself can be prevented or reduced.

As described above, it is preferred that the fuel cell has the following feature (7). This can ensure the prevention of cross leakage and impart the excellent gas sealing performance.

(7) The coating layer contains the material same as the electrolyte layer.

That is, the coating layer is made of the material same as the electrolyte layer that can obviously prevent the occurrence of cross leakage between the fuel electrode layer and the air electrode layer. This can ensure the prevention of cross leakage and secure the sufficient gas sealing performance.

As described above, it is preferred that the fuel cell has the following features (8) to (10). This can ensure the prevention of cross leakage.

(8) The metal supporting plate includes the porous portion at the inside and the dense portion at the outside with respect to the in-plane direction perpendicular to the thickness direction.

(9) The gap predetermined is on the dense portion.

(10) The width in the in-plane direction of the gap predetermined is smaller than the distance in the in-plane direction between the outer edge of the porous portion and the inner edge of the glass sealing member.

That is, since the gap predetermined is on the dense portion, for example, it is not necessary to provide another sealing member that seals a part of the porous portion against gas in order to prevent the occurrence of cross leakage. Further, this configuration can reduce the joining interface between members that can cause deterioration of the gas sealing performance. As a result, the occurrence of cross leakage can be prevented more reliably.

As described above, it is preferred that the fuel cell has the following feature (11). This can ensure the prevention of cross leakage.

(11) The size of the electrolyte layer in the in-plane direction is larger than the size of the porous portion in the in-plane direction.

That is, since the size of the electrolyte layer in the in-plane direction is larger than the size of the porous portion in the in-plane direction, for example, it is not necessary to provide another sealing member that seals a part of the porous portion against gas in order to prevent the occurrence of cross leakage. Further, this configuration can reduce the joining interface between members that can cause deterioration of the gas sealing performance. As a result, the occurrence of cross leakage can be prevented more reliably.

As described above, it is preferred that the fuel cell has the following features (12) and (13). These can ensure the prevention of cross leakage and impart the excellent power generation performance.

(12) The cell structure includes the fuel electrode layer between the metal supporting plate and the electrolyte layer.

(13) The size of the electrolyte layer in the in-plane direction is larger than the size of the fuel electrode layer in the in-plane direction.

That is, since the cell structure includes the fuel electrode layer between the metal supporting plate and the electrolyte layer, and since the size of the electrolyte layer in the in-plane direction is larger than the size of the fuel electrode layer in the in-plane direction, for example, it is not necessary to provide another sealing member that seals a part of the fuel electrode layer against gas in order to prevent the occurrence of cross leakage. Further, this configuration can reduce the joining interface between members that can cause deterioration of the gas sealing performance. As a result, the occurrence of cross leakage can be prevented more reliably. Further, by the fuel electrode layer, the excellent power generation performance can be achieved.

As described above, it is preferred that the fuel cell has the following feature (14). This can ensure the prevention of cross leakage.

(14) The dense portion forms a frame that blocks gas permeation.

That is, since the dense portion forms a frame that blocks gas permeation, for example, it is not necessary to provide another member with through holes around the metal supporting plate. Further, this configuration can reduce the joining interface between members that can cause deterioration of the gas sealing performance. As a result, the occurrence of cross leakage can be prevented more reliably.

Second Embodiment

Figure 6:
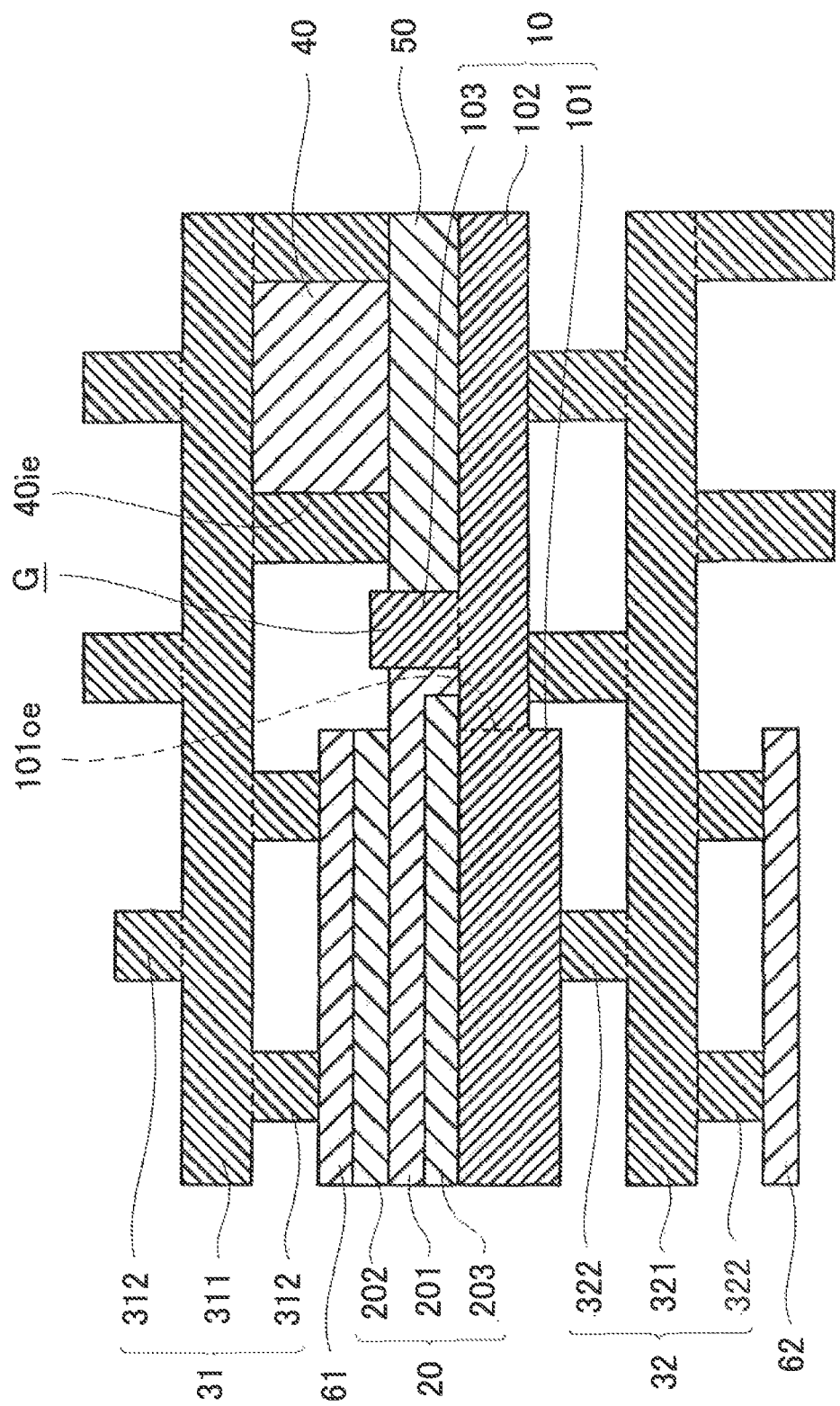
FIG. 6 is a schematic cross-sectional view of a fuel cell according to a second embodiment of the present invention.

Next, a fuel cell according to a second embodiment of the present invention will be described in detail. FIG. 6 is a schematic cross-sectional view of the fuel cell according to the second embodiment, specifically a cross-sectional view taken along a line corresponding to the line V-V' in FIG. 4. The same reference signs are denoted to the same components as those of the above-described embodiment, and the repetitive description thereof is omitted.

As illustrated in FIG. 6, the fuel cell 2 of the embodiment is different from the fuel cell 1 of the above-described embodiment in that a protrusion 103 is provided at the gap G predetermined. The other unillustrated components are the same as those illustrated in FIG. 1 to FIG. 5 except for the protrusion 103. In the illustrated example, the protrusion 103 is formed by a metal supporting plate 10, more specifically a dense portion 102. However, the protrusion 103 is not limited thereto. For example, the protrusion 103 may be formed by disposing another member on the dense portion 102. Further, it is not necessary that the protrusion 103 is as dense as the dense portion 102.

As described above, since the fuel cell has the features (1) to (6), the occurrence of cross leakage can be prevented more reliably. Further, the fuel cell has a secondary advantage of reducing or preventing deterioration of the gas sealing performance. As described above, it is preferred that the fuel cell suitably has the features (7) to (14). These can ensure the prevention of cross leakage and impart the excellent gas sealing performance and the excellent power generation performance. As described above, the predetermined protrusion 103 can reliably prevent contact of the coating layer or the glass sealing member with the cell structure. This can prevent a crack of the glass sealing member or the coating layer from propagating to the cell structure and eventually to the electrolyte layer more reliably. As a result, the occurrence of cross leakage can be prevented more reliably.

While the present invention is described with a few embodiments, the present invention is not limited to these embodiments, and a various changes can be made without departing from the features of the present invention.

For example, the above-described features of the fuel cell according to the preferred embodiments can be employed in any suitable combination.

REFERENCE NUMBERS LIST 1, 2 Fuel cell
10 Metal supporting plate
101 Porous portion
101*oe* Outer edge
102 Dense portion
103 Protrusion
20 Cell structure
201 Electrolyte layer
202 Air electrode layer
203 Fuel electrode layer
31, 32 Separator
311, 321 Flat plate portion
312, 322 protrusion
40 Glass sealing member
40*ie* Inner edge
50 Coating layer

61, 62 Porous current collector
70 Sealing portion
G Gap
H1 to H4 Through hole

The invention claimed is:

1. A fuel cell, comprising:
a metal supporting plate;
a cell structure comprising an electrolyte layer, wherein the cell structure is disposed on the metal supporting plate;
a separator disposed on the cell structure; and
a glass sealing member disposed between the metal supporting plate and the separator at an outer side of the cell structure,
wherein the fuel cell further comprises a coating layer that is disposed between the metal supporting plate and the glass sealing member and that is in contact with the metal supporting plate and the glass sealing member, and
the cell structure and the coating layer are provided with a gap predetermined between the cell structure and the coating layer,
wherein the metal supporting plate comprises a porous portion at an inside and a dense portion at an outside with respect to an in-plane direction perpendicular to a thickness direction,
the gap predetermined is on the dense portion, and
a width of the gap predetermined in the in-plane direction is smaller than a distance in the in-plane direction between an outer edge of the porous portion and an inner edge of the glass sealing member.

2. The fuel cell according to claim 1, wherein the coating layer contains a material same as the electrolyte layer.

3. The fuel cell according to claim 1, wherein a size of the electrolyte layer in the in-plane direction is larger than a size of the porous portion in the in-plane direction.

4. The fuel cell according to claim 3,
wherein the cell structure comprises a fuel electrode layer disposed between the metal supporting plate and the electrolyte layer,
a size of the electrolyte layer in the in-plane direction is larger than a size of the fuel electrode layer in the in-plane direction.

5. The fuel cell according to claim 1,
wherein the cell structure comprises a fuel electrode layer disposed between the metal supporting plate and the electrolyte layer,
a size of the electrolyte layer in the in-plane direction perpendicular to the thickness direction is larger than a size of the fuel electrode layer in the in-plane direction.

6. The fuel cell according to claim 1,
wherein the dense portion forms a frame that blocks gas permeation.

7. The fuel cell according to claim 2, wherein a size of the electrolyte layer in the in-plane direction is larger than a size of the porous portion in the in-plane direction.

8. The fuel cell according to claim 7,
wherein the cell structure comprises a fuel electrode layer disposed between the metal supporting plate and the electrolyte layer,
a size of the electrolyte layer in the in-plane direction is larger than a size of the fuel electrode layer in the in-plane direction.

9. The fuel cell according to claim 2,
wherein the cell structure comprises a fuel electrode layer disposed between the metal supporting plate and the electrolyte layer,
a size of the electrolyte layer in the in-plane direction perpendicular to the thickness direction is larger than a size of the fuel electrode layer in the in-plane direction.

10. The fuel cell according to claim 2,
wherein the dense portion forms a frame that blocks gas permeation.

\* \* \* \* \*